United States Patent
March Nomen et al.

(10) Patent No.: US 10,330,087 B2
(45) Date of Patent: Jun. 25, 2019

(54) LIGHTNING PROTECTION SYSTEM FOR WIND TURBINE BLADES WITH AN EFFECTIVE INJECTION AREA TO CARBON FIBER LAMINATES AND A BALANCED LIGHTNING CURRENT AND VOLTAGE DISTRIBUTION BETWEEN DIFFERENT CONDUCTIVE PATHS

(71) Applicant: GAMESA INNOVATION & TECHNOLOGY, S. L., Sarriguren (Navarra) (ES)

(72) Inventors: Victor March Nomen, Sarriguren (ES); Joan Montanya Puig, Terrasa (ES)

(73) Assignee: SIEMENS GAMESA RENEWABLE ENERGY INNOVATION & TECHNOLOGY, S. L., Sarriguren (Navarra) (ES)

( * ) Notice: Subject to any disclaimer, the term of this patent is extended or adjusted under 35 U.S.C. 154(b) by 385 days.

(21) Appl. No.: 15/173,896

(22) Filed: Jun. 6, 2016

(65) Prior Publication Data

US 2016/0369781 A1    Dec. 22, 2016

(30) Foreign Application Priority Data

Jun. 17, 2015 (ES) .................................. 201500449

(51) Int. Cl.
F03D 1/06 (2006.01)
F03D 80/30 (2016.01)

(52) U.S. Cl.
CPC ........... *F03D 80/30* (2016.05); *F03D 1/0675* (2013.01); *F05B 2280/105* (2013.01);
(Continued)

(58) Field of Classification Search
CPC . F03D 80/30; F03D 1/06; F03D 1/065; F03D 1/0675; F05B 2280/6003;
(Continued)

(56) References Cited

U.S. PATENT DOCUMENTS

2007/0074892 A1\* 4/2007 Hibbard ................ H02G 13/00
174/117 FF
2008/0073098 A1\* 3/2008 Llorente Gonzalez ......................
B82Y 30/00
174/2

(Continued)

FOREIGN PATENT DOCUMENTS

ES     2 396 839 A1    2/2013
WO     2006/051147 A1  5/2006

OTHER PUBLICATIONS espacenet English abstract of WO 2006/051147 A1.
espacenet English abstract of ES 2 396 839 A1.

*Primary Examiner* — Richard A Edgar
*Assistant Examiner* — Elton K Wong
(74) *Attorney, Agent, or Firm* — Ladas & Parry LLP

(57) ABSTRACT

A lightning protection system for a wind turbine blade with one or two carbon fiber laminates and one or more down conductors equipotentialized with them by one or more auxiliary cables comprising at least one local lightning current injection area in the carbon fiber laminates associated with one auxiliary cable having secondary cables derived from the auxiliary cable and connected to conductive devices embedded in the carbon fiber laminates which are configured for avoiding overcurrents in the carbon fiber laminates. The invention also provides a lightning protection system for achieving a balanced distribution of currents and voltages between the down conductors and the carbon fiber laminates.

20 Claims, 4 Drawing Sheets

(52) U.S. Cl.
CPC .............. *F05B 2280/1021* (2013.01); *F05B 2280/1071* (2013.01); *F05B 2280/6013* (2013.01); *Y02E 10/721* (2013.01)

(58) Field of Classification Search
CPC ............ F05B 2280/6013; Y02E 10/72; Y02E 10/721; H02G 13/00
See application file for complete search history.

(56) References Cited

U.S. PATENT DOCUMENTS

| | | | |
|---|---|---|---|
| 2008/0095624 A1* | 4/2008 | Lewke | F03D 80/30 416/146 R |
| 2011/0267027 A1* | 11/2011 | Iannotti | G01R 29/0842 324/72 |
| 2012/0134826 A1* | 5/2012 | Arocena De La Rua | F03D 1/0675 416/146 R |
| 2015/0204311 A1* | 7/2015 | Clemens | F03D 11/0025 361/118 |

* cited by examiner

LIGHTNING PROTECTION SYSTEM FOR WIND TURBINE BLADES WITH AN EFFECTIVE INJECTION AREA TO CARBON FIBER LAMINATES AND A BALANCED LIGHTNING CURRENT AND VOLTAGE DISTRIBUTION BETWEEN DIFFERENT CONDUCTIVE PATHS

FIELD OF THE INVENTION

The invention relates to the control of the lightning current injection to carbon laminates to avoid local overcurrents and the lightning current and voltage distribution between different conductive paths in lightning protection system for wind turbine blades.

BACKGROUND

Lightning protection systems for wind turbine blades usually comprise lightning receptor arrangements having an external metallic receptor element and an electrically conductive internal block connected to a down conductor of a grounding arrangement of the wind turbine. Once captured lightning currents by the receptor element must be transmitted to the electrically conductive internal block that connect the receptor element to the down conductor.

The evolution in the development of wind turbines towards increased power output had led to larger wind turbines both in tower height and rotor diameter.

As an increasing blade length involves and increased rigidity wind turbine blades incorporating carbon fiber laminates are needed. As carbon fiber laminates are conductive they must be connected in parallel with the down conductor to prevent the generation of internal arcs between the down conductor and the carbon fiber laminates and to avoid direct lightning impacts over them.

WO 2006/051147 A1 describes a lightning protection system comprising means for equipotentializing the carbon fiber laminates with the down conductor including auxiliary cables to connect directly the down conductor with the carbon fiber laminates. These auxiliary cables are connected using a joint screwed to a metal plate in direct contact with the layers of carbon fiber. The electrical connection can be improved by adding conductive resins to the joint area.

If the wind turbine blade has, for example, one carbon fiber laminate, the lightning protection system is converted into a two-branched circuit in parallel: one branch formed by the down conductor, of low resistance and high inductance, and the other branch formed by the carbon fiber laminate, having high resistance and low inductance. When lightning strikes on one receptor element, the lightning protection system must evacuate the current, whose waveform is characterized by having a first phase in which the current rises steeply, followed by a second phase where the current drops slowly. When this current is injected into the circuit formed by the carbon fiber laminate connected in parallel to the down conductor, the current is distributed as follows:

During the steep rise phase, most of the current is transmitted by the conductor with less inductance (carbon fiber laminate).
During the gradual drop phase, most of the current is transmitted by the conductor with less resistance (down conductor).

With the current distribution described above, the carbon fiber laminate undergoes a large current peak at the beginning of the discharge. On the other side as the size of the blades increases, the inductance of the carbon fiber laminates (wider and thicker) decreases causing that the fraction of the current conducted by the carbon fiber laminates increases raising a problem as the carbon fiber laminates contain resins that degenerate at temperatures between 100° C. and 200° C.).

To solve this problem, ES 2 396, 839 A1 discloses the use of a high-inductance device placed in the connection between a carbon fiber laminate and a down conductor to reduce the passage of current through the carbon fiber laminate and favour its conduction through the down conductor.

A problem of lightning protection system of wind turbine blades with carbon fiber laminates is that local lightning current injection to carbon laminates may not be properly distributed producing damage in the injection area. This is caused by the transient nature of the lightning strike together with differences in material conductivities which reduce the effective lightning current injection area of the connection.

Another problem is that the lightning current and voltage distribution between the down conductors and the carbon fiber laminates may not be balanced due to variations of the real values of the impedance of the carbon fiber laminates used in a wind turbine blade with respect to their expected values when the lightning protection system is designed.

This invention is directed to the solution of these problems.

SUMMARY OF THE INVENTION

The invention provides a lightning protection system for a wind turbine blade comprising at least a lightning receptor connected to one or more down conductor of a grounding arrangement of the wind turbine blade and one or two carbon fiber laminates. The down conductors are equipotentialized with the carbon fiber laminates by auxiliary cables which are connected to conductive plates embedded in the carbon fiber laminates at various points along the wind turbine blade. The lightning protection system further comprises at least one local lightning current injection area in the carbon fiber laminates associated to one auxiliary cable having one or more additional parallel conductive paths comprising secondary cables derived from said auxiliary cable and connected to conductive devices embedded in the carbon fiber laminates which are configured for avoiding overcurrents in the carbon fiber laminates.

The configurations of said additional parallel conductive paths include several means for controlling the current injected by each of them on the carbon fiber laminates such as resistors in the secondary cables, placing the conductive paths at a given distance between them, using secondary cables and/or conductive devices of different resistances or using conductive devices of different materials or geometries.

The lightning protection system of the invention further comprises means for achieving a balanced distribution of currents and voltages between the down conductors and the carbon fiber laminates.

In the case of a wind turbine blade with one carbon fiber laminate, if there is a negative difference exceeding a predetermined threshold between the impedance of the carbon fiber laminate and the reference value considered in the design of the lightning protection system, the lightning protection system further comprises one or more impedance devices in said auxiliary cables for achieving a balanced distribution of currents and voltages between the down conductors and the carbon fiber laminate.

In the case of a wind turbine blade with two carbon fiber laminates, if the difference between the impedances of the carbon fiber laminates exceeds a predetermined threshold, the lightning protection system further comprises one or more impedance devices in said auxiliary cables configured for achieving a balanced distribution of currents and voltages between the down conductors and the carbon fiber laminates.

Other features and advantages of the present invention will be understood from the following detailed description in relation with the enclosed figures.

DETAILED DESCRIPTION OF THE INVENTION

Wind turbine blades with multiple conductive elements along its length can be found with inclusion of new technologies or materials as part of its structure. This is the case of wind turbine blades using carbon fiber laminates as part of its structure or electric and electronic equipment along the blade or at its tip. In all of these cases, there are multiple conductive paths to ground lightning current. The existence of multiple conductive paths implies that the different paths must transmit an amount of lightning currents during the event of a lightning strike to a lightning receptor.

Figure 1:
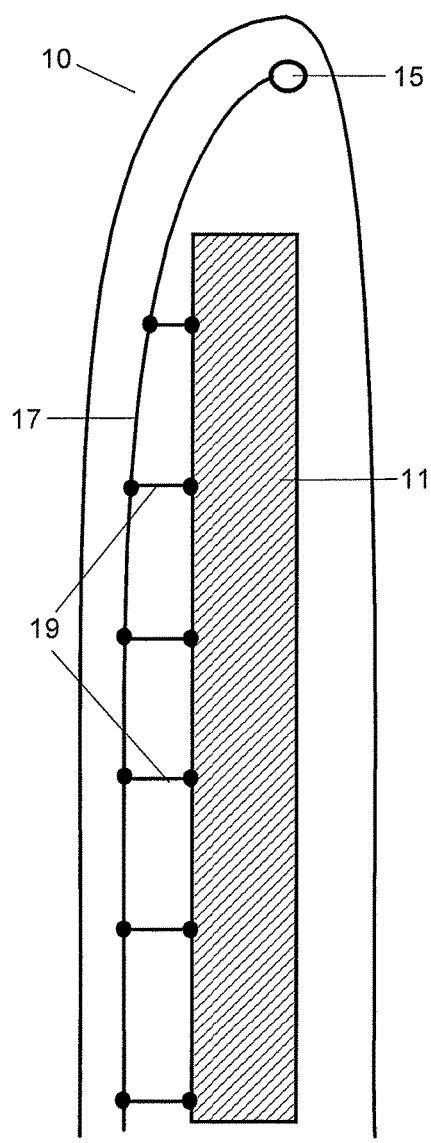
FIG. 1 is a schematic plan view of a wind turbine blade with a lightning protection system known in the art.

In the case, for example, of a wind turbine blade 10 with a carbon fiber laminate 11 (see FIG. 1) the conductive paths are a down conductor 17 connected to a lightning receptor 15 and to grounding arrangement (not shown) and a carbon fiber laminate 11. Both conductive paths 11, 17 are equipotentialized by means of auxiliary cables 19 along the wind turbine blade 10 to distribute lightning currents and reduce the risk of sparks between them.

To improve the known lightning protection systems of wind turbine blades with carbon fiber laminates the invention proposes in the first place a local lightning injection area 14 associated to one auxiliary cable 19 and close, typically, to one lightning receptor which is configured for avoiding overcurrents in the carbon fiber laminates. The auxiliary cable 19 is typically connected to a conductive plate 31 embedded in a carbon fiber laminate.

Figure 2A:
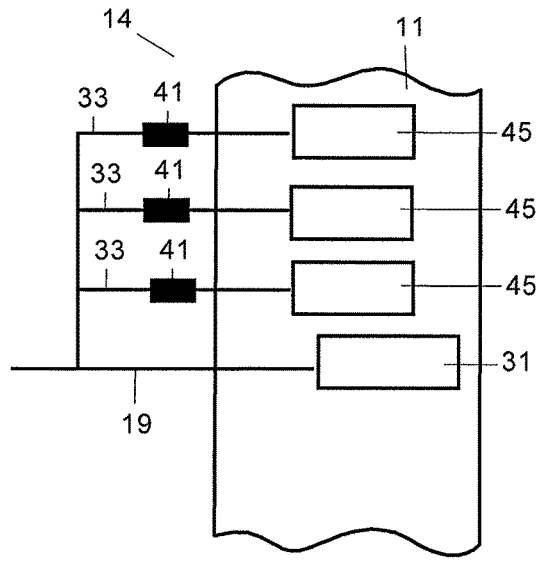
FIGS. 2a-2d are schematic diagrams illustrating four embodiments of a local lightning current injection area according to the invention.

In one embodiment (see FIG. 2a) the local injection area 14 in a carbon fiber laminate 11 comprises three secondary cables 33 derived from an auxiliary cable 19 connected to conductive devices 45 embedded in the carbon fiber laminate 11. The conductive devices 45 can be made of steel alloys, copper, aluminium, brass, tungsten, nichrome, conductive composite materials and non-conductive composite materials with conductive additives. The use of several conductive devices 45 (typically conductive plates) increases the effective injection area of lightning currents in the carbon fiber laminate 11. Each of the secondary cables 33 has a resistor 41 of a resistance between 2-50 m$\Omega$ to control the amount of current injected on the different conductive devices 45.

Figure 2B:
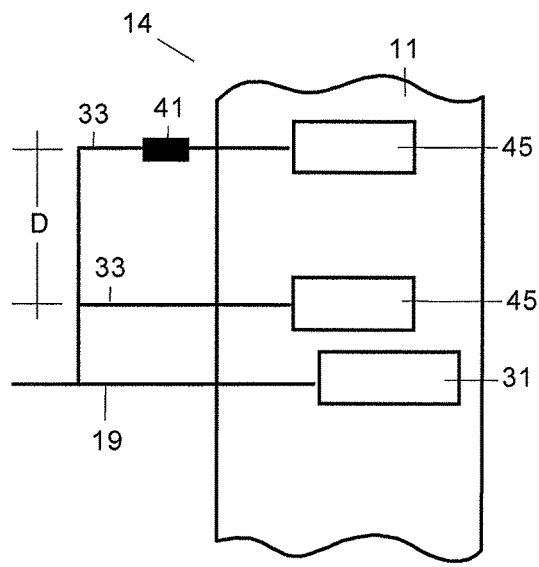

In another embodiment (see FIG. 2b) the local injection area 14 in a carbon fiber laminate 11 comprises two secondary cables 33 derived from an auxiliary cable 19 connected to conductive devices 45 embedded in the carbon fiber laminate 11. In this case the control means of the lightning current injected in the conductive devices 45 are a resistor 41 placed in one of the secondary cables 33 and a given separation distance D between the conductive devices 45. D may be comprised between 10-300 cm.

Figure 2C:
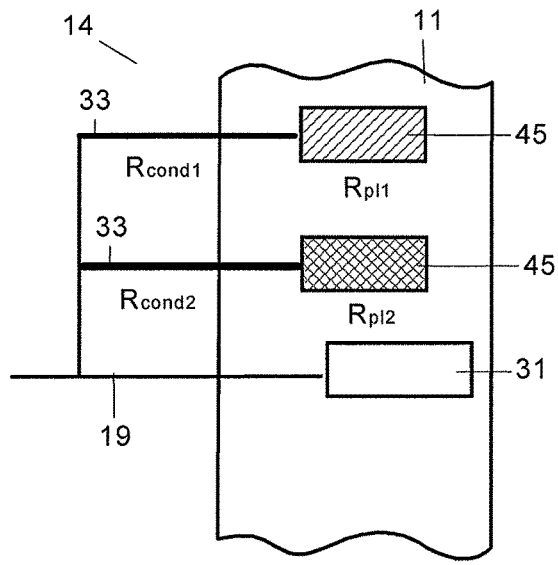

In another embodiment (see FIG. 2c) the local injection area 14 in a carbon fiber laminate 11 comprises two secondary cables 33 derived from an auxiliary cable 19 connected to conductive devices 45 embedded in the carbon fiber laminate 11. In this case the means used to control the lightning current injected in the conductive devices 45 are secondary cables 33 of different resistances $R_{cond1}$, $R_{cond2}$ and conductive devices 45 of different resistances choosing suitable combinations of materials and geometries. For conductive devices 45 of the same geometry one of them, made of steel alloy, can have, for instance, a resistance $R_{pl1}$ and the other, made of brass, copper or nichrome, a resistance $R_{pl2}$.

Figure 2D:
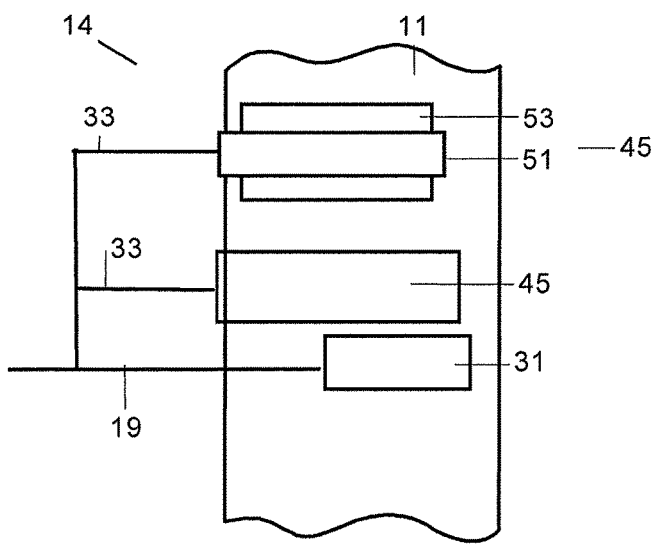

In another embodiment (see FIG. 2d) the means used to vary the resistance of different lightning current injection paths are conductive devices 45 of different materials and geometries, for example, using in one of them a combination of a conductive plate 51 and a conductive mesh 53 positioned between the conductive plate 51 and the carbon fiber laminate. Other alternative is using conductive plates of different width.

In the second place the invention proposes achieving a balanced lightning current and voltage distribution between the down conductors and the carbon fiber laminates in the wind turbine blade.

Figure 3:
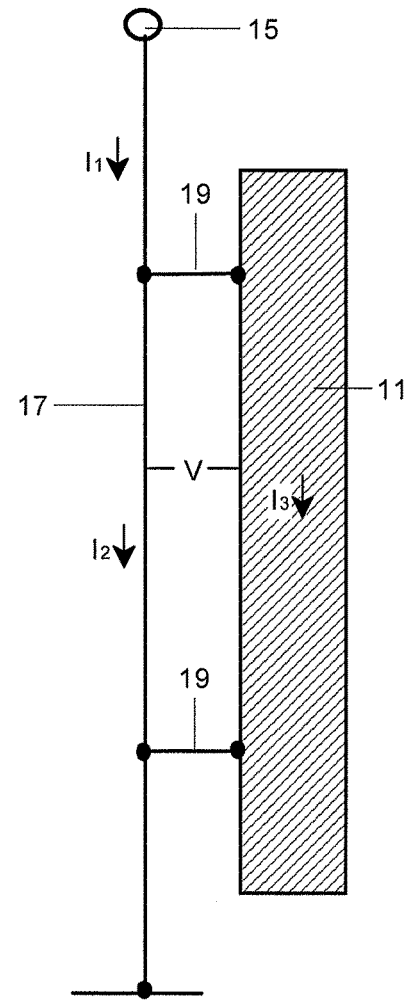
FIG. 3 is a schematic diagram illustrating the distribution of currents in a wind turbine blade between a down conductor and a carbon fiber laminate.

With the use of multiple conductive paths, a lightning current distribution is achieved which is a function of the materials and geometry of these. However, equipotential points do not permit the control of lightning current waveforms and voltages found between different elements at different blade radius. As shown in FIG. 3 in a branch between two auxiliary cables 19 the input lightning current $I_1$ is distributed between the lightning current $I_2$ along the down conductor 17 and the lightning current $I_3$ along the carbon fiber laminate 11 being possible that the values of $I_2$ and $I_3$ are unbalanced because the impedance of the carbon laminate 11 is different to the expected. In this respect it should be noted that, on the one hand, the manufacture of carbon fiber laminates do not allow guarantee a short range of variation of its impedance. The variability of the impedance of carbon fiber laminates manufactured by the same method can be important (the difference between the resistances of two carbon fiber laminates can be greater than 50%) and, consequently, they can lead to much higher currents and voltages than those expected in the design of the lightning protection system. Different impedance to the expected in a carbon fiber laminate does not involve any structural or integrity damage of the wind turbine blade.

To control and balance the lightning currents along the conductive paths of a wind turbine blade the invention proposes incorporating impedance devices 25 in one or more auxiliary cables 19 if the difference between the impedance of the carbon fiber laminate and the impedance considered in the design of the system exceeds a predetermined threshold.

The features of the impedance devices 25 are determined in function of the impedance of the carbon fiber laminate 11 measured after its manufacturing.

Figure 4A:
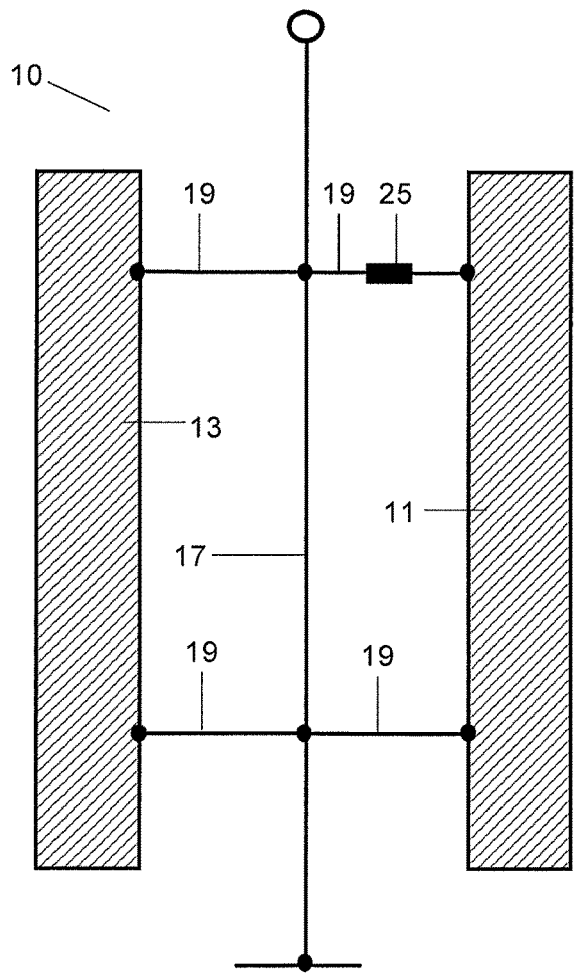
FIG. 4a is a schematic diagram illustrating the lightning protection system of the invention in a wind turbine blade having a down conductor and two carbon fiber laminates and FIG. 4b is an electrical model of the three conductive paths of the system.
Figure 4B:
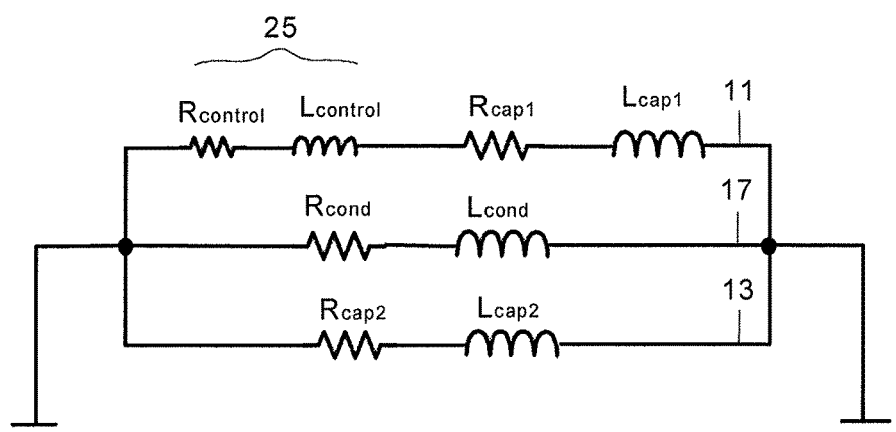

In the case of a wind turbine blade 10 with three conductive paths: an upper carbon fiber laminate 11, a lower carbon fiber laminate 13 and a down conductor 17 (see FIG. 4a) the invention can be better understood considering the electrical model shown in FIG. 4b.

The impedances of the three conductive paths are represented by, respectively, circuits with resistors and inductors of resistance and inductance values $R_{cap1}$, $L_{cap1}$; $R_{cap2}$, $L_{cap2}$; $R_{cond}$, $L_{cond}$, being $R_{cap1}$, $L_{cap1}$ lower than $R_{cap2}$, $L_{cap2}$. To balance the current distribution in the three conductive paths, an impedance device 25 having a resistor and an inductor of resistance and inductance values $R_{control}$, $L_{control}$ is incorporated to the first path 11. The values of $R_{control}$, $L_{control}$ thus depend on the differences between $R_{cap1}$, $L_{cap1}$ and $R_{cap2}$, $L_{cap2}$, being the resistance the main factor.

If, for example $R_{cap1}=200$ m$\Omega$ and $R_{cap2}=400$ m$\Omega$) the distribution of currents between carbon fiber laminates 11, 13 would be (supposing a lineal distribution) ⅔ by carbon fiber laminate 11 and ⅓ by carbon fiber laminate 13. Then to achieve a balance current distribution the resistance $R_{control}$ of the impedance device 25 incorporated to the lightning protection system should be of 200 m$\Omega$.

Figure 5:
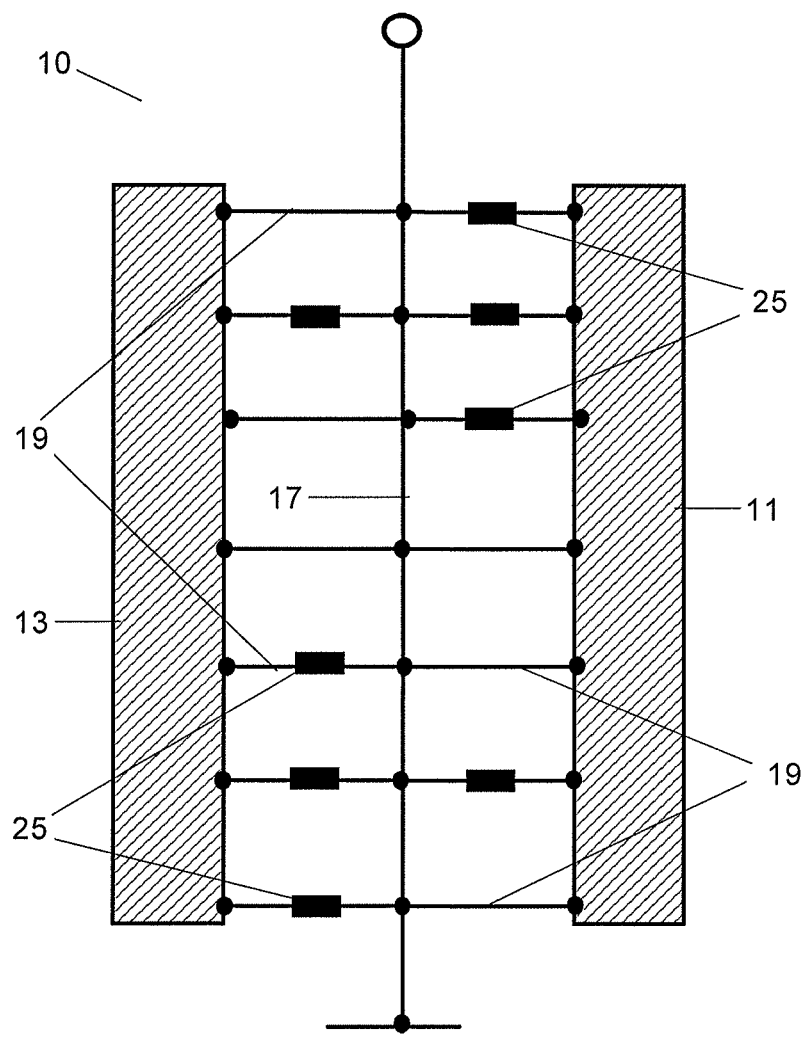
FIG. 5 is a schematic diagram illustrating an embodiment of the lightning protection system of the invention in a wind turbine blade having a down conductor and two carbon fiber laminates.

The lightning protection system of a wind turbine blade 10 may comprise the use of multiple impedance devices 25 located at different equipotential points as shown in FIG. 5 to balance and control lightning current and voltages.

Although the present invention has been described in connection with various embodiments, it will be appreciated from the specification that various combinations of elements, variations or improvements therein may be made, and are within the scope of the invention as defined by the appended claims.

The invention claimed is:

1. A lightning protection system for a wind turbine blade comprising at least a lightning receptor connected to one or more down conductors of a grounding arrangement of the wind turbine blade and one or two carbon fiber laminates; the down conductors being equipotentialized with the carbon fiber laminates by one or more auxiliary cables which are connected to conductive plates embedded in the carbon fiber laminates at various points along the wind turbine blade; wherein the lightning protection system further comprises at least one local lightning current injection area in the carbon fiber laminates associated to one auxiliary cable having one or more additional parallel conductive paths comprising secondary cables derived from said auxiliary cable and connected to conductive devices embedded in the carbon fiber laminates which are configured for avoiding overcurrents in the carbon fiber laminates, wherein the lightning protection system further comprises at least two secondary cables having different resistances in a local lightning current injection area.

2. A lightning protection system according to claim 1, comprising at least a resistor in one secondary cable of a local lightning current injection area.

3. A lightning protection system according to claim 2, wherein the resistance of said resistor is comprised between 2-50 m$\Omega$.

4. A lightning protection system according to claim 1, comprising at least two conductive devices having different resistances in one local lightning current injection area.

5. A lightning protection system according to claim 4, wherein said at least two conductive devices are conductive plates made of one of the following materials: steel alloys, copper, aluminium, brass, tungsten, nichrome, conductive composite materials, and non-conductive composite materials with conductive additives.

6. A lightning protection system according to claim 4, wherein one of said at least two conductive devices is an ensemble of a conductive plate and a metallic mesh.

7. A lightning protection system according to claim 1, comprising at least two additional parallel conductive paths wherein their conductive devices are separated by a distance D between 10-300 cm.

8. A lightning protection system according to claim 1, wherein
the wind turbine blade comprises one carbon fiber laminate;
the lightning protection system is designed for a reference value of the impedance of the carbon fiber laminate;
the lightning protection system further comprises one or more impedance devices in said auxiliary cables in the case of existing a negative difference exceeding a predetermined threshold between the impedance of the carbon fiber laminate and said reference value;
said one or more impedance devices are configured to distribute currents and voltages between the one or more down conductors and the carbon fiber laminate.

9. A lightning protection system according to claim 8, wherein said impedance devices comprise one or more of the following passive elements: a resistor, an inductor, and a capacitor.

10. A lightning protection system according to claim 1, wherein
the wind turbine blade comprises two carbon fiber laminates;
the lightning protection system further comprises one or more impedance devices in said auxiliary cables in the case of existing a difference exceeding a predetermined threshold between the impedances of the carbon fiber laminates;
said one or more impedance devices are configured to distribute currents and voltages between the one or more down conductors and the carbon fiber laminates.

11. A lightning protection system according to claim 10, wherein said impedance devices comprise one or more of the following passive elements: a resistor, an inductor, and a capacitor.

12. A lightning protection system for a wind turbine blade comprising at least a lightning receptor connected to one or more down conductors of a grounding arrangement of the wind turbine blade and one or two carbon fiber laminates; the down conductors being equipotentialized with the carbon fiber laminates by one or more auxiliary cables which are connected to conductive plates embedded in the carbon fiber laminates at various points along the wind turbine blade; wherein the lightning protection system further comprises at least one local lightning current injection area in the carbon fiber laminates associated to one auxiliary cable having one or more additional parallel conductive paths comprising secondary cables derived from said auxiliary cable and connected to conductive devices embedded in the carbon fiber laminates which are configured for avoiding overcurrents in the carbon fiber laminates, wherein the lightning protection system further comprises at least two conductive devices having different resistances in one local lightning current injection area.

13. A lightning protection system according to claim 12, comprising at least a resistor in one secondary cable of a local lightning current injection area.

14. A lightning protection system according to claim 13, wherein the resistance of said resistor is comprised between 2-50 mΩ.

15. A lightning protection system according to claim 12, comprising at least two secondary cables having different resistances in a local lightning current injection area.

16. A lightning protection system according to claim 12, wherein said at least two conductive devices are conductive plates made of one of the following materials: steel alloys, copper, aluminium, brass, tungsten, nichrome, conductive composite materials, and non-conductive composite materials with conductive additives.

17. A lightning protection system according to claim 12, wherein one of said at least two conductive devices is an ensemble of a conductive plate and a metallic mesh.

18. A lightning protection system according to claim 12, comprising at least two additional parallel conductive paths wherein their conductive devices are separated by a distance D between 10-300 cm.

19. A lightning protection system according to claim 12, wherein
the wind turbine blade comprises one carbon fiber laminate;
the lightning protection system is designed for a reference value of the impedance of the carbon fiber laminate;
the lightning protection system further comprises one or more impedance devices in said auxiliary cables in the case of existing a negative difference exceeding a predetermined threshold between the impedance of the carbon fiber laminate and said reference value;
said one or more impedance devices are configured to distribute currents and voltages between the one or more down conductors and the carbon fiber laminate.

20. A lightning protection system according to claim 12, wherein
the wind turbine blade comprises two carbon fiber laminates;
the lightning protection system further comprises one or more impedance devices in said auxiliary cables in the case of existing a difference exceeding a predetermined threshold between the impedances of the carbon fiber laminates;
said one or more impedance devices are configured to distribute currents and voltages between the one or more down conductors and the carbon fiber laminates.

* * * * *